S. H. TYERS.
STRIPPER HARVESTER OR LIKE MACHINE.
APPLICATION FILED AUG. 5, 1909.
975,003. Patented Nov. 8, 1910.
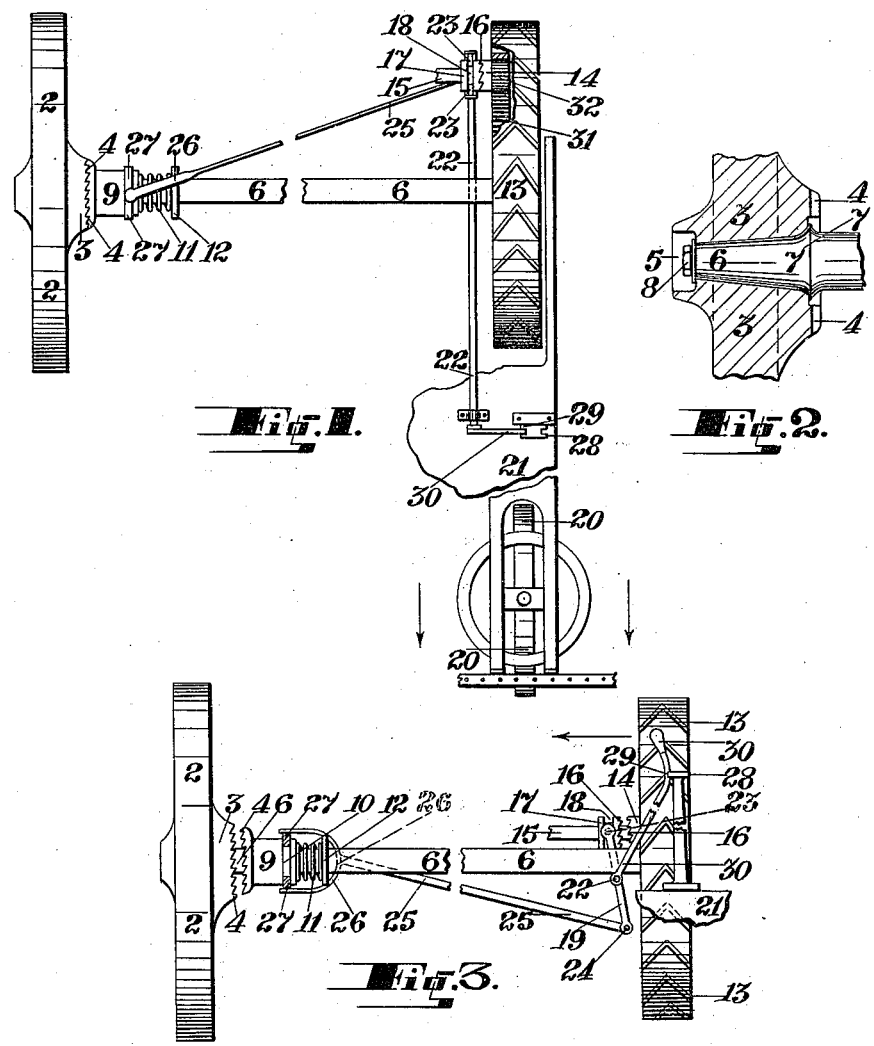
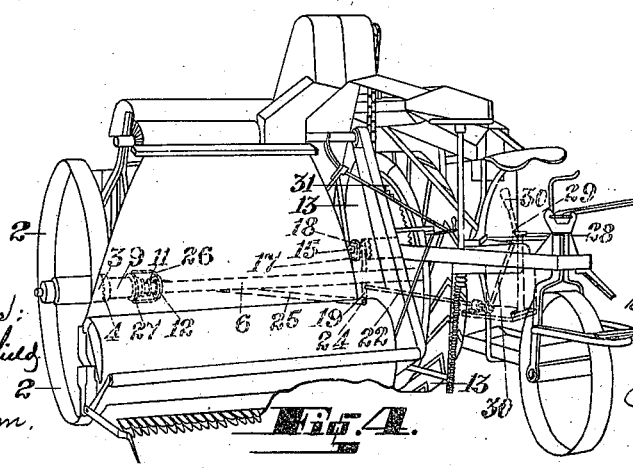

UNITED STATES PATENT OFFICE.

SAMUEL HAROLD TYERS, OF LORQUON, VICTORIA, AUSTRALIA.

STRIPPER-HARVESTER OR LIKE MACHINE.

975,003.  Specification of Letters Patent.  Patented Nov. 8, 1910.

Application filed August 5, 1909. Serial No. 511,304.

*To all whom it may concern:*

Be it known that I, SAMUEL HAROLD TYERS, a subject of the King of Great Britain and Ireland, and a resident of the post-town of Lorquon via the township of Nhill, in the county of Lowan, State of Victoria, and Commonwealth of Australia, have invented certain new and useful Improvements Relating to Stripper-Harvesters or Like Machines, of which the following is a specification.

This invention relates to those machines (mounted on three wheels, the land wheel, crop wheel and a steering wheel) used for removing and treating the heads from the crops of cereals, or for removing the heads and treating, and then bagging the grain.

In the past, on account of the horses drawing from outside of the crop, or one side (not the middle) of the machine there has always been a tendency for the land side of such machines to lead and the crop side to lag as it was drawn over the crop. To overcome this, the horses were frequently deflected from their course onto the land, causing the hair on their land sides, where the tug chain rubbed it, to wear off. On the land side their shoulders at the collar also became inflamed, if not sore. Other means have also been tried to help the crop side of the machine forward, some of which were objectionable. In some machines, the crop wheel has been deflected toward the land, in order to prevent this lagging. But this increased the draft power necessary and the deflected wheel had to slightly drag, scour, or skid through the ground thereby forming a hollow or furrow. This called for more horses or other tractive power. Among other arrangements, a larger diametered crop wheel loose upon a dead axle has also been used to assist the crop side onward.

The object of this invention is to provide a machine, the crop side of which shall not lag behind the land side, in which the draft power requisite shall consequently be less and in which these ends shall be attained with but few parts. It includes a land wheel which is fixed to the axle, which axle becomes a live axle; a crop wheel, which is larger in diameter than the land wheel, is free to overrun the live axle, or is driven by the said axle through the agency of a clutch; also gear for operating the said clutch.

Referring to the drawings which form a part of this specification:—Figure 1 is a plan of the live axle, a land wheel, a crop wheel and a steering wheel with a portion of the framework relative to the driver and the steering wheel. Portion of the land wheel is broken away to show the usual internally toothed ring and pinion driven thereby. Fig. 2 is an enlarged sectional detail view of the hub of the crop wheel and the crop end of the live axle upon which it turns. Fig. 3 is a front elevation of Fig. 1, the framework and steering wheel being removed for convenience of illustration. Fig. 4 is a view of a common stripper harvester machine. In broken lines this invention is shown applied thereto.

Similar numerals of reference indicate like or corresponding parts where they occur in the several views.

On reference to the drawings it will be seen that 2 is the rim of a crop wheel. This is larger in diameter than the land wheel hereinafter referred to. It can be so constructed that its diameter may be increased or diminished in any well known way. Or instead of the diameter of the said wheel being adjustable as mentioned, a larger or a smaller wheel may be substituted. From its circumference may protrude pins, strips or other driving protuberances. The width of the said wheel will depend upon circumstances. In the center of the said rim is a boss 3. Protruding from the near end of the said boss are teeth 4. On the outer end of the said boss is a recess 5 (Fig. 2) and in the center of the said boss is a hole to accommodate an axle hereinafter referred to. The said crop wheel turns upon one end, the crop end, of a live axle 6. The said axle has an enlargement 7. Entering into the crop end of the boss 3 of the crop wheel and on the other end of the axle may be a nut 8 whereby the said wheel is retained longitudinally upon the said axle (Fig. 2). Adjacent to the crop wheel boss 3 is a crop wheel clutch consisting of a sleeve 9. This has on one end teeth 4 engaging with the teeth in the crop wheel boss. The said clutch sleeve rotates, by a key or other means, with the axle and is capable of moving longitudinally thereon. In it may be formed a recess 10 to accommodate the collar, hereinafter referred to, of a connecting rod. Pressing upon the other end of the sleeve is a spiral spring 11 retained in position by a collar 12. On the other end, or land end, of the live axle 6 and secured thereto and rotating the said axle, is a land wheel 13. This land wheel has inside the same an internally toothed ring 31 of the ordinary character common to these machines (Figs. 1 and 4). This toothed ring drives a toothed pinion 32, an extension of which is seen at 14 (Figs. 1 and 3). This toothed pinion (which is common to these machines) and its extension turn loosely upon a shaft 15. This shaft, as is the ordinary practice, drives the stripping drum, peg drum and the other parts of the machine. From the inner end of the said extension protrude teeth 16.

Upon the shaft 15 is a sleeve 17. This rotates with the shaft by a key or other means and is capable of a longitudinal movement upon the said shaft. From it protrude teeth 16 engaging with the teeth upon the extension 14. In the said sleeve may be a recess 18 to accommodate the fork of a declutching lever 19 hereinafter referred to.

In front of the land wheel 13 is a steering wheel 20 (Fig. 1). This is retained to the framework 21 which in turn is retained to the live axle 6 in any well known way.

Secured to one end of a rotatable shaft 22 which may be mounted in any suitable bearings, is the lower end of a declutching lever 19. Upon the other end of the rotatable shaft 22 is a hand lever 30 controlling its movements. The movement of the upper end of this lever is limited by the first stop end 28 and the second stop end 29 of the top of a standard situated above and whose lower end rests upon the framework. The said declutching lever 19 by pins or forks 23 or other means engages with the recess 18 in the shaft sleeve 17. Pivoted to the declutching lever 19 by a pivot pin 24 is the land end of a connecting rod 25, the crop end of which by a fork 26 is attached to a collar 27 fitting loosely in the recess 10. Instead of the connecting rod 25 being pivoted to the declutching lever 19, it may be connected to an independent lever, the driver thereby having independent control of the shaft and also the crop wheel.

When the clutches are engaged the tendency of the crop wheel (it being of a larger diameter than the land wheel) is, to move the crop side of the machine forward at a more rapid rate than the land side. It is, however, partially resisted in this by the steering wheel and partial slip occurs. The tread of the steering wheel may be enlarged on its land side to prevent lateral movement or skidding toward the land. Or it may have an elevated central tread. Should it be desired for turning the machine or other purposes, for the crop wheel to be free of the live axle, the operator pushes the hand lever 30 in the direction of the arrow shown in Fig. 3. This moves the connecting rod 25 away from the crop and with it the fork 26. The crop wheel clutch sleeve 9 moves toward the land, compressing the spiral spring 11 and the teeth protruding from the clutch are withdrawn from the teeth protruding from the wheel. The operator can then spring the handle of the hand lever 30 over the second stop end 29. It is thereby or in any other suitable way, held.

Having now described my invention, what I claim as new and desire to secure by Letters Patent, is:—

1. In stripper harvesters or like machines, the combination of an axle, a land wheel rigidly secured to and driving the axle, a crop wheel loose on said axle and of larger diameter than the land wheel, a clutch for locking the crop wheel to the axle, a driven shaft for operating the cutting mechanism, gearing for driving the said shaft from the land wheel, a clutch controlling the said gearing, and means for simultaneously shifting said clutches into or out of engagement, substantially as and for the purpose specified.

2. In combination, a live axle, a land wheel rigidly secured to and driving the axle and provided with an internal gear, a pinion meshing therewith, a driven shaft, a clutch on the driven shaft adapted to lock the same to the pinion; a crop wheel loosely mounted on the said axle and of larger diameter than the land wheel, a clutch on said axle for locking the crop wheel thereto, a rock shaft, a hand lever for operating the rock shaft, a connection between said rock shaft and the clutch on the driven shaft, and a connection between said rock shaft and a clutch on the axle, whereby said clutches may be simultaneously engaged or disengaged, substantially as and for the purpose set forth.

In testimony whereof, I affix my signature in the presence of two subscribing witnesses.

SAMUEL HAROLD TYERS.

Witnesses:
WILLIAM BRACE BENNETT,
CLIFFORD NICHOLSON WILLIAMS.